Patented Jan. 20, 1953

2,626,288

UNITED STATES PATENT OFFICE 2,626,288

METHOD FOR BRINGING A NEWLY CHARGED CATALYTIC REACTOR ON STREAM

Leo John Ronayne, Borger, Tex., assignor to Phillips Petroleum Company, a corporation of Delaware No Drawing. Application January 6, 1950, Serial No. 137,270

7 Claims. (Cl. 260—680)

This invention relates to the operation of a catalytic converter in which a catalyst bed composed of particulate or pelleted catalyst is employed. In one of its aspects the invention relates to a method of placing such a catalytic converter "on stream" that is, into operation. In another of its aspects, the invention relates to a method of placing "on stream" a catalyst bed, of the type described, in a manner such that at full rates of flow of material to be converted the catalyst particles or pellets will not become disturbed causing undesirable pressure drops across the bed and channeling therethrough. In still another of its aspects, the invention relates to a process for converting a hydrocarbon, for example, by dehydrogenation.

In actual in-the-field operation of certain hydrocarbon dehydrogenation units there are employed flow rates which are so great that the hydrocarbon, together with steam which is used, in passing through the catalyst bed, which is made up of pelleted or otherwise formed particles of catalytic material and which is supported upon a grate, greatly disturbs the arrangement of the particles thus jeopardizing the reactor structure because excessive pressure drops develop which stress the grate and the reactor walls and causing disuniform flow or channeling of the hydrocarbon through the catalyst bed which, as is known, will result in disuniform and therefore undesirable dehydrogenation.

It has now been found, according to this invention, that it is possible to pass, say, a steam-butylene, or other hydrocarbon, mixture at low rates of flow through a catalyst bed as described herein for a time to cause a carbon setting or cementing of the individual catalyst pieces to each other, or to several other pieces. Then considerably greater flow rates can be employed without disturbing the catalyst bed.

Thus, according to this invention there is provided a method for placing on stream a catalytic converter containing a bed of particulate catalyst material which, under on stream conditions of operation, will become disturbed causing undesirable pressure drop and channeling through said bed which comprises the steps of passing a hydrocarbon through said catalyst bed at a flow rate considerably below that of on stream operation and in said bed causing it to deposit coke upon said catalyst material until the individual particles thereof have become fixed or cemented to each other due to the bonding effect of said coke which has been deposited and then placing said converter under the stream conditions.

The conditions under which the bonding or fixing of the catalyst particles will take place can be determined readily by mere routine test. Thus, the invention is not limited to any particular coking conditions as long as the space velocity of the hydrocarbon stream used does not exceed that beyond which the particles of catalyst material will be subjected to motion or vibration in the bed. Obviously, the hydrocarbon stream must not be such that the activity of the catalyst will become impaired. Thus, according to the invention, in an embodiment to be described, steam is used in admixture with the hydrocarbon to cement or bond a steam insensitive catalyst and, therefore, in this particular embodiment the steam is helpful rather than undesirable. The steam acts to modify conditions so that the desired coke-lay down can be obtained. At lower steam-to-olefin ratios more coke can be laid down than at the higher ratios.

Although, the exact conditions to be employed for any given catalyst bed, particle size, flow rate, coke-lay down material or hydrocarbon, etc. can be determined by mere routine test it is here noted that the temperature at the coke-lay down points should of necessity be sufficiently elevated to cause coke-formation of the desired kind and usually will be within the range of 900 to 1300° F. When steam or other diluent is used, its temperature will be, preferably, such that it supplies its own heat thus avoiding undesirable overheating of the hydrocarbon which otherwise may be required to maintain the desired coke-lay down temperature.

The hydrocarbons which can be used in the process of the present invention are numerous. All hydrocarbons can be caused to cokify. However, it is necessary for the process of the invention that only those hydrocarbons be selected which can be caused to cokify under conditions which are not harmful to the particular catalyst being employed. Illustrative of some of the types of the hydrocarbons which can be used in the process of the invention are olefins, for example, butylenes, amylenes, etc., diolefins, for example 1,3-butdiene, isoprene, etc., paraffins such as butane, pentane, etc. and even certain cyclic saturated or unsaturated compounds. The invention is not limited to the compounds disclosed, it being now obvious that the invention resides in the process steps to effect a cementing of the catalyst particles which, given the said process, can be suitably accomplished by one skilled in the art who will be able to select by mere routine test the hydrocarbons or compounds to be used. Ordinarily I use the regular feed stock to the process. Thus in dehydrogenating butene to butadienes, butenes can be employed for the cementing pretreatment. Olefins are much preferred over paraffins, as very little conversion of the latter occurs over my preferred iron oxide dehydrogenation catalyst at the usual temperature of operation.

As already noted the flow rate or space velocity of the coke-lay down stream of material must not exceed that beyond which the catalyst particles will be disturbed to cause undesirable pressure drops, channeling or other undesirable results. Usually the flow rate, in terms of space velocity, will be adjusted so as to be below about 500 standard cubic feet per cubic foot of catalyst per hour, although this value may vary depending upon the exact sizes, shapes and other characteristics of the catalyst particles as well as the overall size and density of the catalyst bed. For best results a flow rate should be selected at which the cementing can be conveniently effected without endangering the freshly packed or regenerated catalyst bed.

The time required to effect cementing of any particular catalyst bed will vary somewhat depending upon its size and other characteristics and this will be readily understood by those skilled in the art. Usually, about four hours to about twelve hours, preferably about six to about ten hours will be found to be sufficient to effect the process of the invention.

In one embodiment of the present invention it has been applied to the cementing or bonding of an iron oxide dehydrogenation catalyst employed in the conversion of butylene to butadiene. This catalyst is iron oxide containing small amounts of potassium and chromium oxide. It is insensitive to steam, and steam is useful in the process of the invention since by employing high steam:hydrocarbon ratios the catalyst is maintained in an active condition for a long period of time without stopping the process flow for catalyst reactivation. In this specific operation, steam is passed through a tubular type superheating furnace and is superheated to about 1300° F. About 200,000 standard cubic feet per hour of a butene-rich hydrocarbon feed stock and 3500 pounds per hour of steam are passed through a hydrocarbon preheater and preheated to about 1050° F. The preheated hydrocarbon is admixed with the superheated steam near the inlet of the catalyst chamber, and the mixture enters the chamber at a temperature at about 1100° F. and a pressure of about 8 pounds per square inch gauge. The mixture passes downwardly through a fixed bed of particles of the dehydrogenation catalyst, supported on a metal grid in the lower portion of the catalyst chamber. The effluent from the catalyst bed is quenched with water to a temperature of about 1000° F. When the present invention has been used the effluent pressure is about 6 pounds per square inch gauge, resulting from a 2 pound pressure drop across the catalyst bed. When the present method of starting up conversion over a fresh catalyst bed was not used, a pressure drop of 4 pounds was considered good and oftentimes higher pressure drops were encountered which resulted in damage to the catalyst supporting grids, as well as disuniform flow and dehydrogenation.

Typical analyses of the hydrocarbon feed and the hydrocarbon portion of the effluent are as follows:

|  | Feed, mol percent | Effluent, mol percent |
|---|---|---|
| $C_3$'s | 0.3 | 20.2 |
| Isobutane | .6 | 1.2 |
| Isobutylene | .4 | 1.7 |
| Butene-1 | 13.8 | 17.4 |
| Butadiene | .2 | 7.9 |
| Normal Butane | 10.7 | 8.0 |
| Butene-2, low boiling | 40.0 | 27.0 |
| Butene-2, high boiling | 33.5 | 15.6 |
| $C_5$'s+ | .5 | 1.0 |

In normal operation a conversion of about 15 per cent and a selectivity of 77 per cent of butadiene is obtained on the basis of 100 mols of effluent.

A typical dehydrogenation temperature is 1130° F., and although this may vary slightly it is generally between 1100 and 1150° F. During normal on-stream operation, the steam:butylene mol ratio ordinarily ranges between 16:1 and 24:1. With the usual feed stock, this corresponds to steam:hydrocarbon ratios between 13:1 and 18.5:1. The dehydrogenation can be satisfactorily carried out within a broad steam:butylene ratio of from 10:1 to 28:1. At the lowest ratios the quantity of carbonaceous material on the catalyst gradually increases resulting in a decline in activity to such an extent that steam regeneration is necessary; hence these low ratios are less preferred. At the higher ratios in the neighborhood of 25:1 and above the conversion per pass is increased considerably but the selectivity decreases and for this reason somewhat lower ratios are ordinarily used. The optimum ratio is determined by the quantity of steam needed to maintain essentially constant catalyst activity, and this optimum is usually found at a steam:butylene ratio of 18:1.

In first putting the catalyst on stream in accordance with the present invention, not only are much lower flow rates than normal employed, but, lower steam:hydrocarbon ratios are also used to provide the desired "setting" of the catalyst by the carbon deposition. A preferred steam:butylene ratio is 6:1, representing a steam:hydrocarbon ratio of 4.8:1 when employing a feed having 80 per cent butene content. The setting can be accomplished over a wide range of steam:butene ratios, but preferably between the ratios of 4:1 and 10:1.

Preferably during start-up procedure the space velocity, which term herein unless otherwise specified refers to the standard volume of total gaseous material including steam and hydrocarbons being passed through the catalyst bed per volume of catalyst per hour, is not more than about $\frac{1}{10}$ the normal space velocity. In the butene dehydrogenation operation under discussion, typical space velocities are as follows:

*Start-up space velocities, v./v./hr.*

Steam _____ 342
Hydrocarbon _____ 72
Butylene _____ 57

*Actual operation space velocities, v./v./hr.*

Steam _____ 4,600
Hydrocarbon _____ 246–342
Butylene _____ 197–276

As an example of the practice of the present invention, the butene dehydrogenation process which has been described, wherein a mixture of butene and steam is passed over an iron oxide dehydrogenation catalyst, was started up with a fresh catalyst employing an admixture of about six parts of steam to one part of butylene (by gas volume). This mixture was passed through the catalyst bed over a period of about eight hours during which time a small quantity of carbon was deposited on the catalyst due to the low steam to hydrocarbon ratio. Then normal flow rate was established by raising the steam: butylene ratio to 18:1 and it was found that the bed remained undisturbed after extended operation. The detailed procedure used involved initially passing the desired quantity of preheated steam through the catalyst case, and gradually adding the hydrocarbon feed until the 6:1 steam: butylene ratio was reached. After these conditions were maintained for 8 hours, additional steam was gradually introduced together with additional hydrocarbon, and the flow rates of steam and hydrocarbon were increased over a period of several hours until the reactor load was 125,000 pounds of steam per hour with sufficient hydrocarbon to give the steam:butylene ratio of 18:1. After this rate was maintained for 24 hours and the equipment had been carefully checked to determine that operation was satisfactory, the steam and hydrocarbon were increased gradually to the desired operating flow rate somewhat above the last mentioned values.

Reasonable variation and modification are possible within the scope of the foregoing disclosure and the appended claims to the invention the essence of which is that a catalyst bed of particulate catalyst material is, in situ, cemented or fixed by causing a deposition of carbon between the particles or pellets in the bed at flow rates and under other conditions such that the bed is not disturbed and then normal on steam conditions are applied to said catalyst bed.

I claim:

1. In the dehydrogenation of an olefinic hydrocarbon, wherein under on stream conditions said hydrocarbon is passed into contact with a bed of particulate iron-oxide catalyst in admixture with a diluent wherein the ratio of diluent to said hydrocarbon is of the order of about 18 to 1 and the normal on stream flow rate through said bed is of the order of about 5000 cubic feet per volume of catalyst per hour, the method of preconditioning said catalyst bed which comprises passing said diluent and said hydrocarbon in a ratio of the order of about 6 to 1 and at a flow rate not exceeding about 500 cubic feet per volume of catalyst per hour for a substantial period of time through said bed and causing said butylene to deposit coke upon said catalyst until the individual particles thereof have become fixed in relation to each other due to the bonding effect of said coke which has been deposited and then placing said bed under on stream conditions.

2. The process of claim 1 wherein said catalyst is a steam-insensitive iron-oxide dehydrogenation catalyst and steam is used in admixture with said hydrocarbon.

3. The process of claim 1 wherein said hydrocarbon is an olefin.

4. The process of claim 1 wherein said olefin is butylene.

5. The process of claim 1 wherein the ratio of steam to butylene is in the range 4:1 to 10:1 and the space velocity is not in excess of 500 cubic feet per volume of catalyst per hour.

6. In the dehydrogenation of butylene to butadiene wherein under on-stream conditions butylene is passed into contact with a bed of particulate-iron oxide catalyst in admixture with steam to butylene wherein the ratio is of the order of about 18:1 and normal on-stream flow in said bed is of the order of 5000 feet per volume of catalyst per hour, the method of preconditioning said catalyst bed which comprises passing steam through said catalyst and gradually adding the hydrocarbon feed until about a 6:1 steam to butylene ratio is reached; maintaining said ratio for about 8 hours at a temperature to cause said butylene to deposit coke upon the catalyst particles until the particles have been fixed in relation to each other due to the bonding effect of said coke which has been deposited and thereafter increasing the total amount of steam and total amount of hydrocarbon introduced to arrive at the on-stream flow rate with a steam to butylene ratio of 18:1.

7. The process of claim 6 wherein the hydrocarbon and steam mixture enters the catalyst bed at about 1100° F. and a pressure of about 8 pounds per square inch and passes downwardly therethrough and wherein a pressure drop across the treated bed is of the order of 2 pounds as against a pressure drop of the order of 4 pounds and higher when this claimed method is not employed.

L. JOHN RONAYNE.

REFERENCES CITED

The following references are of record in the file of this patent:

UNITED STATES PATENTS

| Number | Name | Date |
|---|---|---|
| 2,371,850 | Schulze et al. | Mar. 20, 1945 |
| 2,372,018 | Ruthruff | Mar. 20, 1945 |
| 2,381,677 | Matuszak | Aug. 7, 1945 |